US012275341B2

(12) United States Patent
Taylor

(10) Patent No.: US 12,275,341 B2
(45) Date of Patent: Apr. 15, 2025

(54) PORTABLE STAGE ASSEMBLY

(71) Applicant: Jerome Taylor, Matteson, IL (US)

(72) Inventor: Jerome Taylor, Matteson, IL (US)

(*) Notice: Subject to any disclaimer, the term of this patent is extended or adjusted under 35 U.S.C. 154(b) by 268 days.

(21) Appl. No.: 18/112,355

(22) Filed: Feb. 21, 2023

(65) Prior Publication Data
US 2024/0278705 A1 Aug. 22, 2024

(51) Int. Cl.
B60P 3/00 (2006.01)
A63J 1/02 (2006.01)
B60P 3/025 (2006.01)
E04H 3/28 (2006.01)

(52) U.S. Cl.
CPC ............... B60P 3/0252 (2013.01); A63J 1/02 (2013.01); E04H 3/28 (2013.01)

(58) Field of Classification Search
CPC .. E04H 3/28; E04H 3/22; E04H 3/126; E04H 3/24; E04H 3/26; B60P 3/0252; A63J 1/02; A63J 1/00
See application file for complete search history.

(56) References Cited

U.S. PATENT DOCUMENTS

| 3,620,564 | A | * | 11/1971 | Wenger | E04H 3/28 160/19 |
| 4,958,874 | A | * | 9/1990 | Hegedus | B60P 3/0252 52/79.5 |
| 5,152,109 | A | | 10/1992 | Boers | |
| 5,546,709 | A | * | 8/1996 | Decker | E04H 3/28 296/26.07 |
| 6,006,680 | A | | 12/1999 | Quam | |
| 6,393,769 | B1 | * | 5/2002 | Mertik | E04H 3/28 296/26.14 |
| 8,176,686 | B2 | * | 5/2012 | Santini | E04H 3/28 52/79.5 |
| 8,347,560 | B2 | * | 1/2013 | Gyory | E04B 1/34363 52/79.5 |
| 8,550,528 | B2 | * | 10/2013 | Sidi | B60P 3/34 296/26.02 |
| D707,365 | S | | 6/2014 | Johnstone | |
| 9,896,017 | B1 | * | 2/2018 | Requejo | B60S 9/04 |
| 10,557,276 | B1 | * | 2/2020 | Uhl | B60P 3/0252 |
| 11,242,691 | B2 | | 2/2022 | Williams | |
| 11,292,379 | B2 | | 4/2022 | Wilson, Sr. | |
| 2004/0123529 | A1 | | 7/2004 | Wiese | |

(Continued)

FOREIGN PATENT DOCUMENTS

WO WO9749472 12/1997

Primary Examiner — Chi Q Nguyen

(57) ABSTRACT

A portable stage assembly includes a trailer towable by a tow vehicle which has a floor and a roof. The trailer is open such that the floor defines a stage to facilitate a live performance. A pair of floor panels is each hingedly attached to the trailer and each of the floor panels extends in opposite directions from the trailer when the floor panels are in the deployed position. A pair of roof panels is each hingedly attached to the trailer and each of the roof panels extends in opposite directions from the trailer when the roof panels are positioned in a deployed position. A pair of stage curtains is each slidably attached to the roof of the trailer thereby facilitating the pair of stage curtains to conceal the stage when the stage curtains are closed or to expose the stage when the stage curtains are opened.

11 Claims, 7 Drawing Sheets

(56) References Cited

U.S. PATENT DOCUMENTS

| | | | |
|---|---|---|---|
| 2006/0150530 A1* | 7/2006 | Davey | E04H 3/22 52/7 |
| 2015/0107164 A1* | 4/2015 | Jung | B60P 3/0252 52/7 |
| 2016/0289985 A1* | 10/2016 | Stroud | E04H 3/28 |
| 2020/0378142 A1* | 12/2020 | Williams | E04H 3/28 |

* cited by examiner

PORTABLE STAGE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to stage devices and more particularly pertains to a new stage device for facilitating a stage for a live performance to be quickly set up at any location. The device includes a trailer that has a floor and roof such that the floor defines a stage. The device includes a pair of floor panels that are hingedly attached to the floor and which each extend laterally away from the floor when the floor panels are in a deployed position. The device includes a pair of roof panels that are hingedly attached to the roof and which each extend laterally away from the roof when the roof panels are in a deployed position. The device includes a plurality of power ports integrated into the floor, a pair of light towers and a plurality of light emitters disposed on the light towers and a pair of stage curtains suspended from the roof.

(2) Description of Related Art Including Information Disclosed Under 37 CFR 1.97 and 1.98

The prior art relates to stage devices including a variety of portable stage devices that each at least includes a modular floor and a roof that is hingedly disposed on the modular floor for defining a stage that facilitates a live performance. The prior art discloses a collapsible stage device that includes a flatbed truck, stage lighting that is disposed on telescopic columns and a plurality of seats disposed on the flatbed truck. The prior art discloses a mobile performance stage that includes a flatbed trailer, a pair of floor panels that each positionable to extend laterally away from a floor of the flatbed trailer and a pair of roof panels that are each positionable to extend laterally away from a roof of the flatbed trailer.

BRIEF SUMMARY OF THE INVENTION

An embodiment of the disclosure meets the needs presented above by generally comprising a trailer towable by a tow vehicle which has a floor and a roof. The trailer is open such that the floor defines a stage to facilitate a live performance. A pair of floor panels is each hingedly attached to the trailer and each of the floor panels extends in opposite directions from the trailer when the floor panels are in the deployed position. A pair of roof panels is each hingedly attached to the trailer and each of the roof panels extends in opposite directions from the trailer when the roof panels are positioned in a deployed position. A pair of stage curtains is each slidably attached to the roof of the trailer thereby facilitating the pair of stage curtains to conceal the stage when the stage curtains are closed or to expose the stage when the stage curtains are opened.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
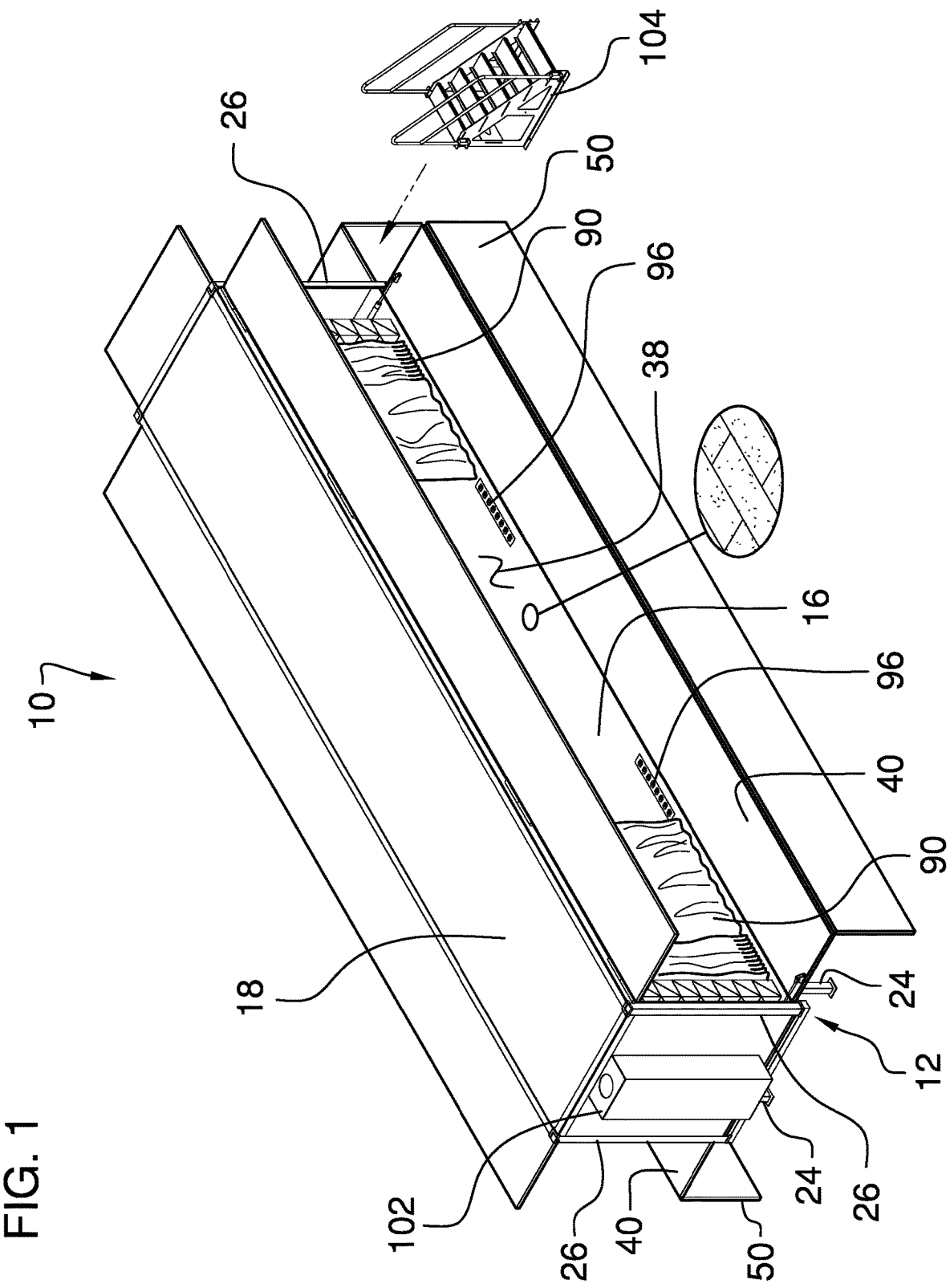
FIG. 1 is a top perspective view of a portable stage assembly according to an embodiment of the disclosure.
Figure 2:
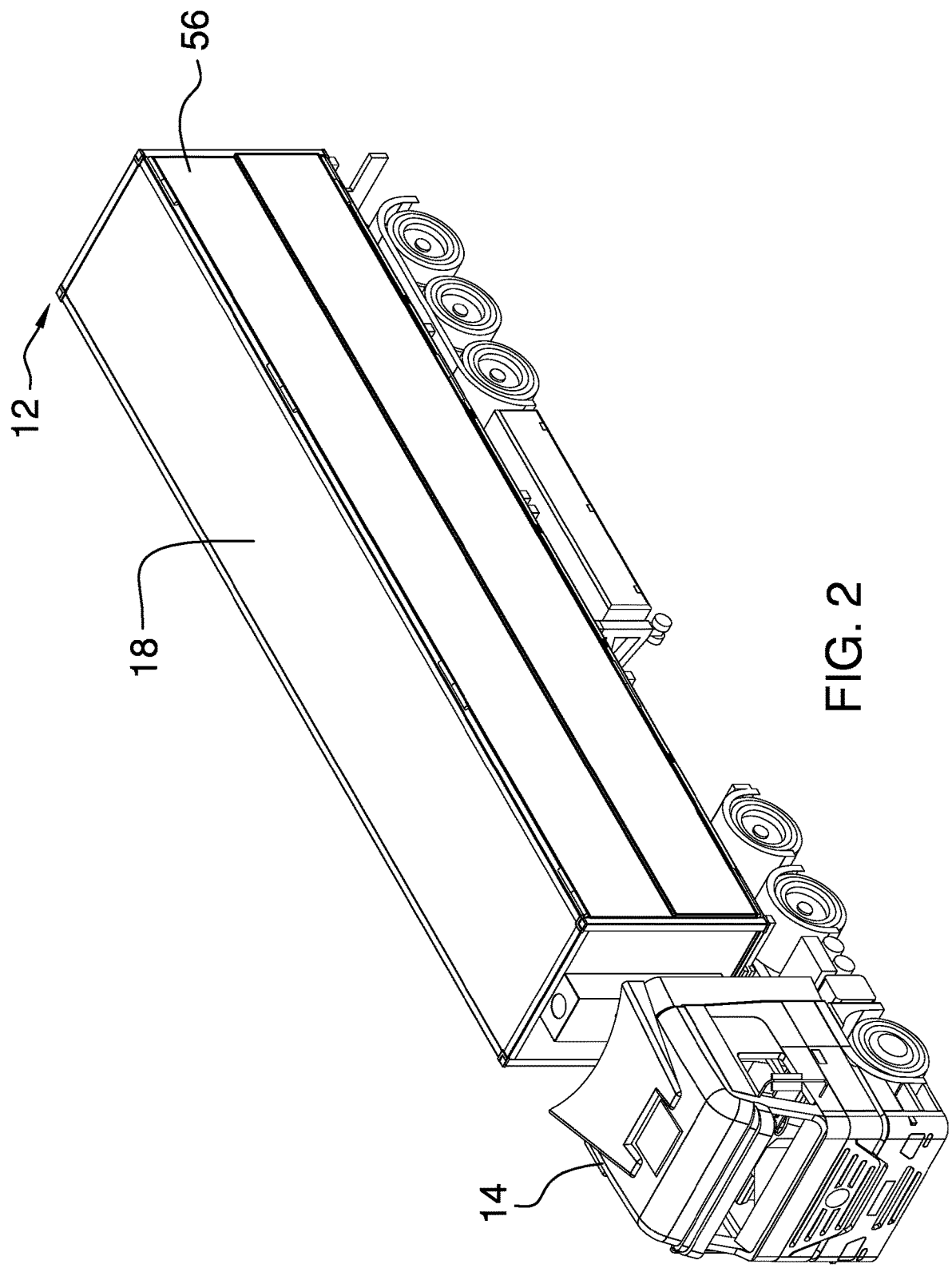
FIG. 2 is a perspective view of an embodiment of the disclosure showing a trailer attached to a tow vehicle.
Figure 3:
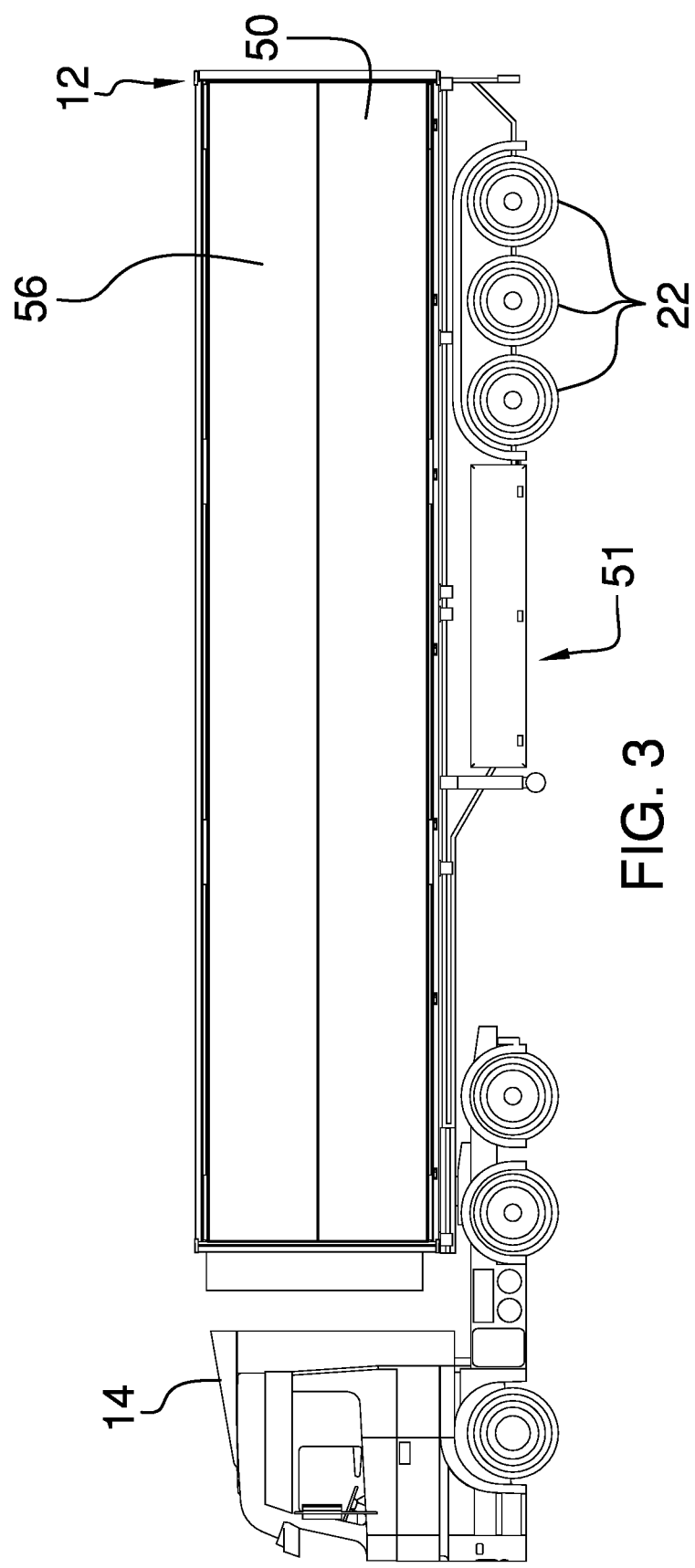
FIG. 3 is a left side view of an embodiment of the disclosure showing a trailer attached to a tow vehicle.
Figure 4:
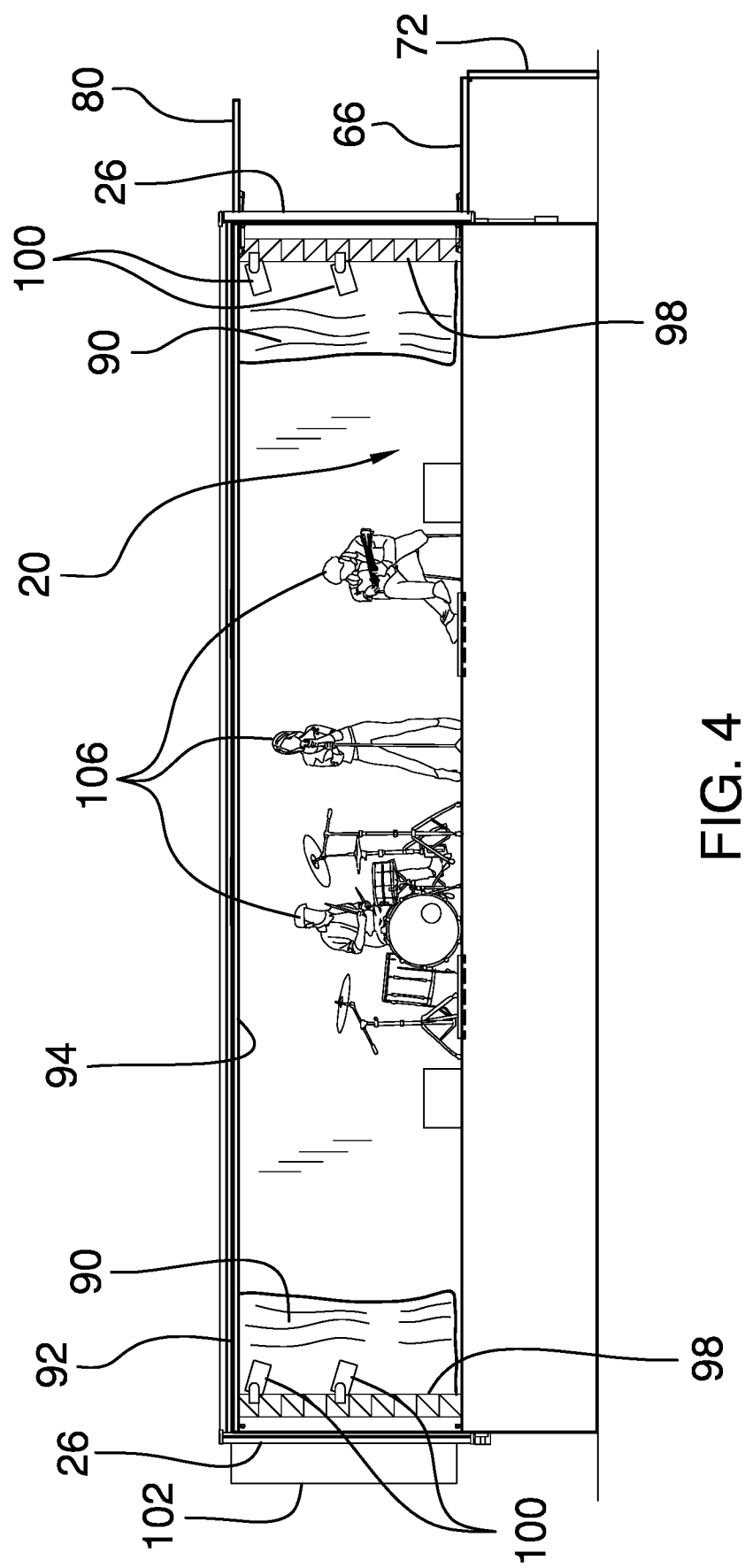
FIG. 4 is a perspective in-use view of an embodiment of the disclosure showing performers on a stage.
Figure 5:
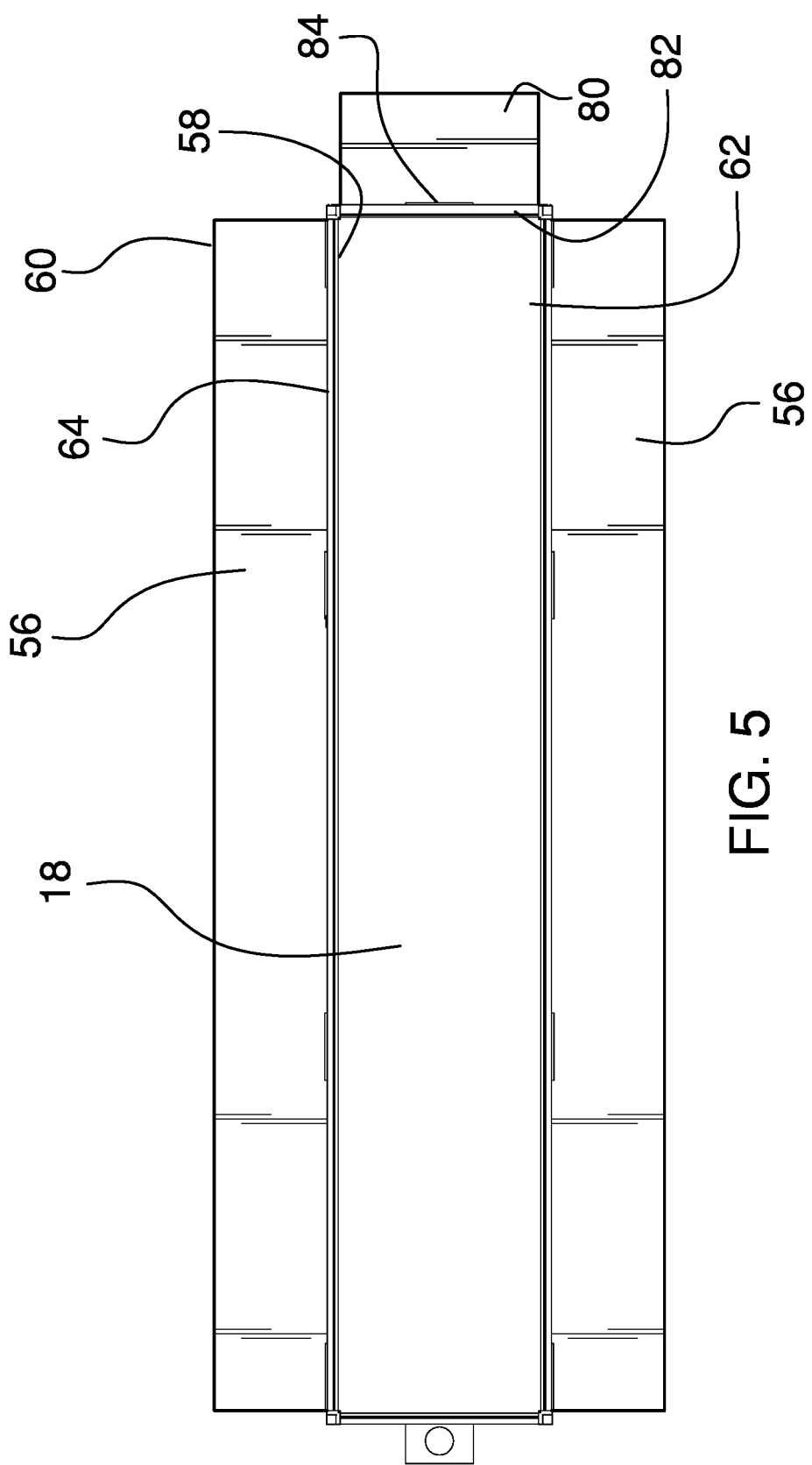
FIG. 5 is a top view of an embodiment of the disclosure.
Figure 6:
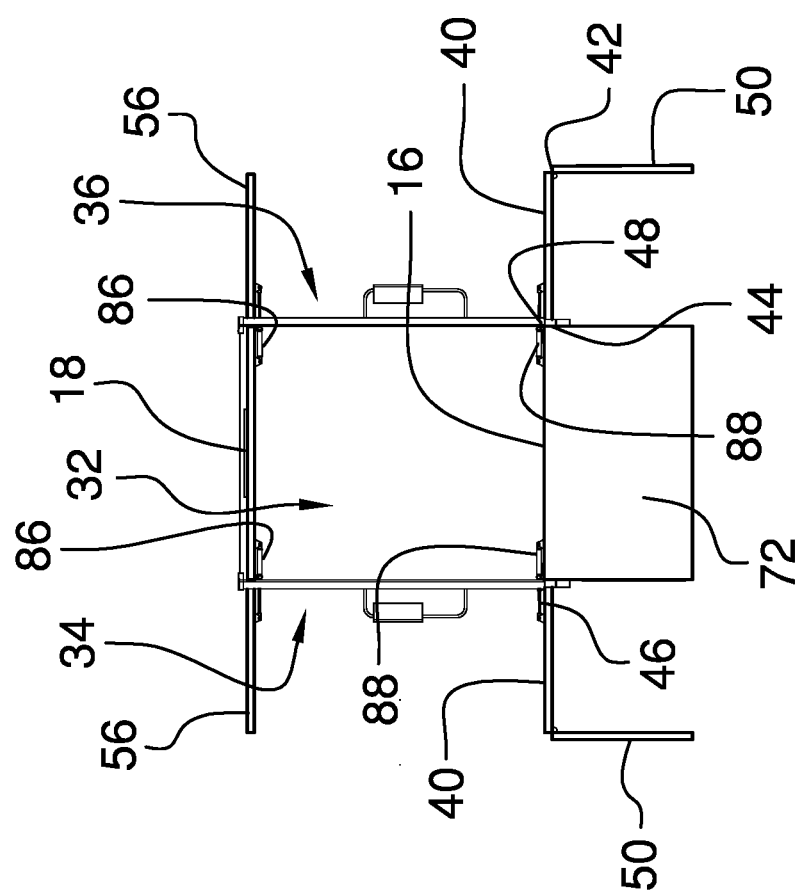
FIG. 6 is a back view of an embodiment of the disclosure.
Figure 7:
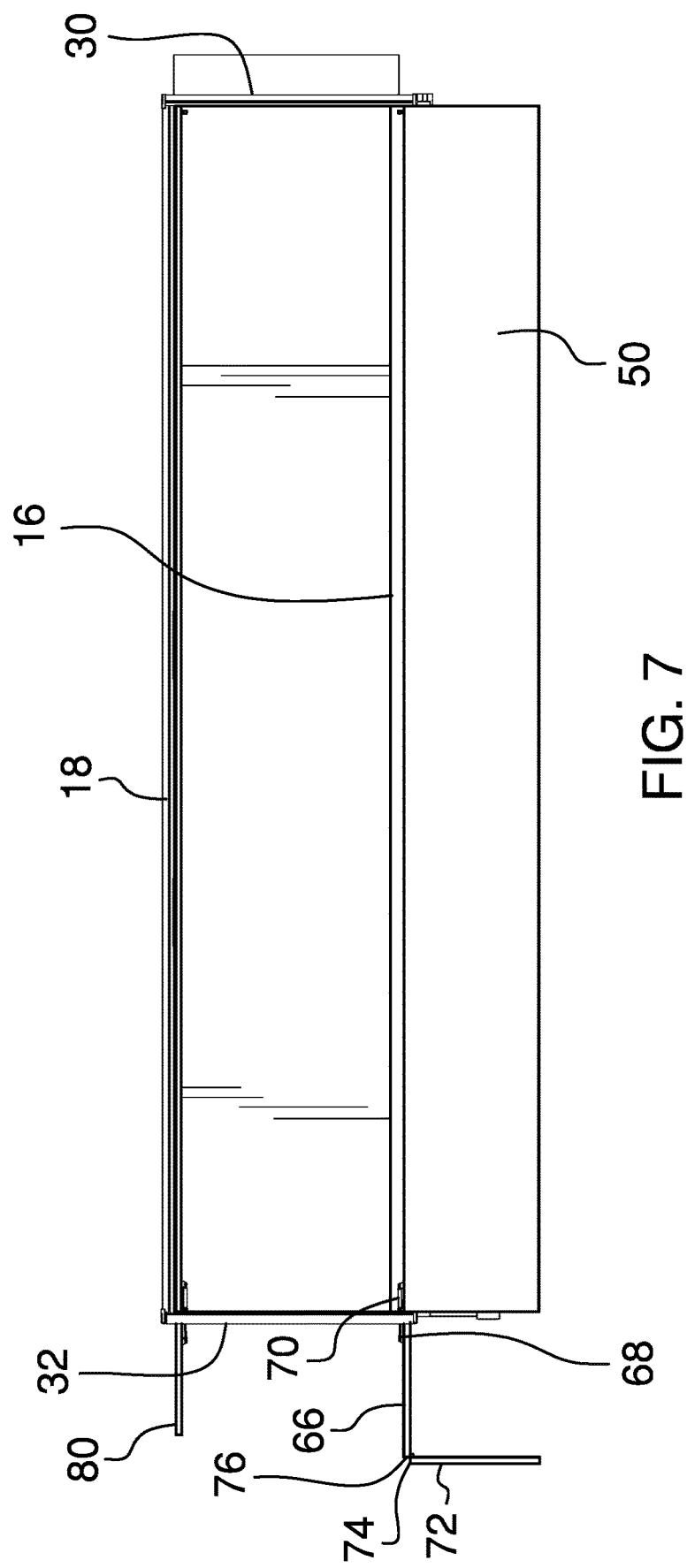
FIG. 7 is a right side view of an embodiment of the disclosure.

With reference now to the drawings, and in particular to FIGS. 1 through 7 thereof, a new stage device embodying the principles and concepts of an embodiment of the disclosure and generally designated by the reference numeral 10 will be described.

As best illustrated in FIGS. 1 through 7, the portable stage assembly 10 generally comprises a trailer 12 is towable by a tow vehicle 14. The trailer 12 has a floor 16 and a roof 18 and the trailer 12 is open such that the floor 16 defines a stage 20. The stage 20 facilitates a live performance to be performed on the stage 20 having the live performance being sheltered by the roof 18. The trailer 12 may comprise a semi trailer or other trailer that has a minimum length of 12.0 meters and the trailer 12 may include a plurality of wheels 22 and a pair of support legs 24 for supporting the trailer 12 when the trailer 12 is not attached to the tow vehicle 14.

The trailer 12 has a plurality of corner posts 26 each extending between the floor 16 and the roof 18 for supporting the roof 18 over the floor 16. Each of the plurality of corner posts 26 is aligned with a respective one of four corners 28 of the floor 16. The trailer 12 has a front end 30, a back end 32, a first lateral side 34 and a second lateral side 36; the front end 30 is closed and each of the first lateral side 34, the second lateral side 36 and the back end 32 is open. The floor 16 has a top surface 38 which comprises a friction enhancing material to facilitate performers to maintain solid footing on the floor 16.

A pair of floor panels 40 is provided and each of the floor panels 40 is hingedly attached to the trailer 12. Each of the floor panels 40 is positionable in a deployed position having each of the floor panels 40 extending in opposite directions from the trailer 12 such that each of the floor panels 40 increases the size of the stage 20 defined by the floor 16 of the trailer 12. Each of the floor panels 40 is positionable in a stored position having each of the floor panels 40 resting against the trailer 12. Each of the floor panels 40 has a front edge 42 and a back edge 44 and the back edge 44 of each of the floor panels 40 is hingedly coupled to a respective one of a first lateral edge 46 and a second lateral edge 48 of the floor 16 of the trailer 12. Each of the floor panels 40 extends between the front end 30 and the back end 32 of the trailer 12 and each of the floor panels 40 lies on a plane that is oriented parallel with the floor 16 of the trailer 12 when the floor panels 40 are in the deployed position. Conversely, each of the floor panels 40 lies on a plane that is perpendicularly oriented with the floor 16 of the trailer 12 when the floor panels 40 are in the stored position having the pair of floor panels 40 extending upwardly from the floor 16 of the trailer 12.

A pair of wheel panels 50 is provided and each of the wheel panels 50 has a first edge 52 that is hingedly coupled to the front edge 42 of a respective one of the floor panels 40. Each of the wheel panels 50 extends downwardly from the respective floor panel 40 when the respective floor panel 40 is positioned in the deployed position. In this way each of the wheel panels 50 can conceal the undercarriage 51 of the trailer 12 to enhance the appearance of the trailer 12 during the live performance. Each of the wheel panels 50 lies against the respective floor panel 40 when the pair of floor panels 40 are in the stored position.

A pair of roof panels 56 is provided and each of the roof panels 56 is hingedly attached to the trailer 12. Each of the roof panels 56 is positionable in a deployed position having each of the roof panels 56 extending in opposite directions from the trailer 12 such that each of the roof panels 56 increases the size of the roof 18 of the trailer 12. Conversely, each of the roof panels 56 is positionable in a stored position having each of the roof panels 56 resting against the trailer 12. Each of the roof panels 56 has a forward edge 58 and a rearward edge 60. The forward edge 58 of each of the roof panels 56 is hingedly coupled to a respective one of a first lateral edge 62 and a second lateral edge 64 of the roof 18 of the trailer 12. Each of the roof panels 56 extends between the front end 30 and the back end 32 of the trailer 12 and each of the roof panels 56 lies on a plane that is oriented parallel with the roof 18 of the trailer 12 when the roof panels 56 are in the deployed position. Conversely, each of the roof panels 56 lies on a plane that is oriented perpendicular to the roof 18 of the trailer 12 when the roof panels 56 are in the stored position having the pair of roof panels 56 extending downwardly from the roof 18 of the trailer 12.

A tailgate floor panel 66 is provided which has a first edge 68 that is hingedly coupled to a rear edge 70 of the floor 16 of the trailer 12. The tailgate floor panel 66 lies on a plane that is oriented parallel with the floor 16 of the trailer 12 when the tailgate floor panel 66 is in the deployed position. The tailgate floor panel 66 lies on a plane that is perpendicularly oriented with the floor 16 of the trailer 12 when the floor panels 40 are in the stored position having the tailgate floor panel 66 extending upwardly from the floor 16 of the trailer 12. Additionally, the tailgate floor panel 66 extends between the first lateral edge 62 and the second lateral edge 64 of the floor 16 of the trailer 12.

A tailgate wheel panel 72 is provided that has a first edge 74 which is hingedly coupled to a second edge 76 of the tailgate floor panel 66. The tailgate wheel panel 72 extends downwardly from the tailgate floor panel 66 when the tailgate floor panel 66 is positioned in the deployed position thereby facilitating the tailgate wheel panel 72 to conceal the undercarriage 51 of the trailer 12. In this way the tailgate wheel panel 72 enhances the appearance of the trailer 12 during the live performance. The tailgate wheel panel 72 lies against the tailgate floor panel 66 when the tailgate floor panel 66 is in the stored position.

A tailgate roof panel 80 is provided and the tailgate roof panel 80 has a first edge 82 that is hingedly coupled to a rear edge 84 of the roof 18 of the trailer 12. The tailgate roof panel 80 lies on a plane that is oriented parallel with the roof 18 of the trailer 12 when the tailgate roof panel 80 is in a deployed position. Conversely, the tailgate roof panel 80 lies on a plane that is perpendicularly oriented with the roof 18 of the trailer 12 when the tailgate roof panel 80 is in a stored position having the tailgate roof panel 80 extending upwardly from the floor 16 of the trailer 12. The tailgate roof panel 80 extends between the first lateral edge 62 and the second lateral edge 64 of the roof 18 of the trailer 12.

A plurality of roof actuators 86 is provided and each of the roof actuators 86 is coupled between the roof 18 of the trailer 12 and a respective one of the roof panels 56 and the tailgate roof panel 80. The plurality of roof actuators 86 is biased into an extended condition to urge the roof panels 56 and the tailgate roof panel 80 into the deployed position. Furthermore, each of the roof actuators 86 is urgeable into a collapsed condition to facilitate the plurality of roof panels 56 to be urged into the stored position. Each of the roof actuators 86 may comprise a hydraulic piston or the like to assist a worker with urging the roof panels 56 and the tailgate roof panel 80 into the deployed position.

A plurality of floor actuators 88 is provided and each of the floor actuators 88 is coupled between the floor 16 of the trailer 12 and a respective one of the floor panels 40 and the tailgate floor panel 66. The plurality of floor actuators 88 is biased into an extended condition to urge the respective floor panels 40 and the tailgate floor panel 66 into the deployed position. Conversely, each of the floor actuators 88 is urgeable into a collapsed condition to facilitate the plurality of floor panels 40 and the tailgate floor panel 66 to be positioned in the stored position. Each of the floor actuators 88 may comprise a hydraulic piston or the like to assist a worker with urging the floor panels 40 and the tailgate floor panel 66 into the deployed position.

A pair of stage curtains 90 is provided and each of the stage curtains 90 is slidably attached to the roof 18 of the trailer 12. The pair of stage curtains 90 conceals the stage 20 when the stage curtains 90 are closed and the pair of stage curtains 90 exposes the stage 20 when the stage curtains 90 are opened. Each of the stage curtains 90 has a top edge 92 which slidably engages a bottom surface 94 of the roof 18 of the trailer 12. Additionally, the pair of stage curtains 90 may include a track that extends laterally across the roof 18 of the trailer 12.

A plurality of power outlets 96 is provided and each of the plurality of power outlets 96 is integrated into the floor 16 of the trailer 12 to supply power to an electronic device such as electric instruments employed for a musical performance, for example. A pair of lighting towers 98 is provided and each of the lighting towers 98 is attached to the trailer 12. Each of the lighting towers 98 includes a plurality of light emitters 100 which are each positionable to be pointed in a variety of directions. In this way each of the plurality of light emitters 100 can emit light onto the stage 20 at a desired point thereby facilitating stage lighting for the live performance. Each of the lighting towers 98 extends between the floor 16 of the trailer 12 and the roof 18 of the trailer 12 and each of the lighting towers 98 is aligned with the first lateral edge 46 of the floor 16 of the trailer 12. Furthermore, each of the lighting towers 98 is aligned with a respective one of the front end 30 and the back end 32 of the trailer 12.

A generator 102 is provided and the generator 102 is attached to the front end 30 of the trailer 12. The generator 102 is in electrical communication with each of the plurality of power outlets 96 and each of the plurality of light emitters 100. In this way the generator 102 supplies electrical power to each of the plurality of power outlets 96 and each of the plurality of light emitters 100 when the generator 102 is turned on. The generator 102 may include an internal combustion engine and an electric generator that is driven by the internal combustion engine.

In use, the trailer 12 is towed to a desired location and each of the roof panels 56 and the floor panels 40 are moved into the deployed position. Additionally, the wheel panels 50 are pivoted into the deployed position when the floor panels 40 are urged into the deployed position. Each of the tailgate roof panel 80 and the tailgate floor panel 66 can be urged into the deployed position, if so desired, and as shown in FIG. 1 a portable staircase 104 can be positioned adjacent to the tailgate floor panel 66 to facilitate performers 106 to ascend to the stage 20. The generator 102 is turned on to supply power to the power outlets 96 and the light emitters 100 thereby facilitating the stage 20 to accommodate a live performance.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable stage assembly for facilitating a stage for a live performance to be set up at any location, said assembly comprising:
   a trailer being towable by a tow vehicle, said trailer having a floor and a roof, said trailer being open such that said floor defines a stage wherein said stage is configured to facilitate a live performance to be performed on said stage having the live performance being sheltered by said roof;
   a pair of floor panels, each of said floor panels being hingedly attached to said trailer, each of said floor panels being positionable in a deployed position having each of said floor panels extending in opposite directions from said trailer such that each of said floor panels increases a size of said stage defined by said floor of said trailer, each of said floor panels being positionable in a stored position having each of said floor panels resting against said trailer;
   a pair of roof panels, each of said roof panels being hingedly attached to said trailer, each of said roof panels being positionable in a deployed position having each of said roof panels extending in opposite directions from said trailer such that each of said roof panels increases a size of said roof of said trailer, each of said roof panels being positionable in a stored position having each of said roof panels resting against said trailer;
   a pair of stage curtains, each of said stage curtains being slidably attached to said roof of said trailer wherein said pair of stage curtains conceal said stage when said stage curtains are closed and expose said stage when said pair of stage curtains are opened;
   a plurality of power outlets, each of said plurality of power outlets being integrated into said floor of said trailer wherein each of said plurality of power outlets is configured to supply power to an electronic device; and
   a pair of lighting towers, each of said lighting towers being attached to said trailer, each of said lighting towers including a plurality of light emitters, each of said lighting towers being positionable in a variety of directions wherein each of said plurality of light emitters is configured to emit light onto said stage at a desired point, each of said lighting towers extending between said floor of said trailer and said roof of said trailer; and
   wherein said trailer has a plurality of corner posts each extending between said floor and said roof for supporting said roof over said floor, each of said plurality of corner posts being aligned with a respective one of four corners of said floor, said trailer having a front end, a back end, a first lateral side and a second lateral side, said front end being closed, each of said first lateral side and said second lateral side and said back end being open, said floor having a top surface comprising a friction enhancing material wherein said floor is configured to facilitate performers to maintain solid footing on said floor.

2. The assembly according to claim 1, wherein each of said floor panels has a front edge and a back edge, said back edge of each of said floor panels being hingedly coupled to a respective one of a first lateral edge and a second lateral edge of said floor of said trailer, each of said floor panels extending between said front end and said back end of said trailer, each of said floor panels lying on a plane being oriented parallel with said floor of said trailer when said floor panels are in said deployed position, each of said floor panels lying on a plane being perpendicularly oriented with said floor of said trailer when said floor panels are in said stored position having said pair of floor panels extending upwardly from said floor of said trailer.

3. The assembly according to claim 1, wherein each of said roof panels has a forward edge and a rearward edge, said forward edge of each of said roof panels being hingedly coupled to a respective one of a first lateral edge and a second lateral edge of said roof of said trailer, each of said roof panels extending between said front end and said back end of said trailer, each of said roof panels lying on a plane being oriented parallel with said roof of said trailer when said roof panels are in said deployed position, each of said roof panels lying on a plane being oriented perpendicular to said roof of said trailer when said roof panels are in said stored position having said pair of roof panels extending downwardly from said roof of said trailer.

4. The assembly according to claim 1, wherein:
each of said lighting towers is aligned with a first lateral edge of said floor of said trailer, each of said lighting towers being aligned with a respective one of said front end and said back end of said trailer; and
said assembly includes a generator being attached to front end of said trailer, said generator being in electrical communication with each of said plurality of power outlets and each of said plurality of light emitters such that said generator supplies electrical power to each of said plurality of power outlets and each of said plurality of light emitters when said generator is turned on.

5. A portable stage assembly for facilitating a stage for a live performance to be set up at any location, said assembly comprising:
a trailer being towable by a tow vehicle, said trailer having a floor and a roof, said trailer being open such that said floor defines a stage wherein said stage is configured to facilitate a live performance to be performed on said stage having the live performance being sheltered by said roof;
a pair of floor panels, each of said floor panels being hingedly attached to said trailer, each of said floor panels being positionable in a deployed position having each of said floor panels extending in opposite directions from said trailer such that each of said floor panels increases a size of said stage defined by said floor of said trailer, each of said floor panels being positionable in a stored position having each of said floor panels resting against said trailer;
a pair of roof panels, each of said roof panels being hingedly attached to said trailer, each of said roof panels being positionable in a deployed position having each of said roof panels extending in opposite directions from said trailer such that each of said roof panels increases a size of said roof of said trailer, each of said roof panels being positionable in a stored position having each of said roof panels resting against said trailer;
a pair of stage curtains, each of said stage curtains being slidably attached to said roof of said trailer wherein said pair of stage curtains conceal said stage when said stage curtains are closed and expose said stage when said pair of stage curtains are opened;
a plurality of power outlets, each of said plurality of power outlets being integrated into said floor of said trailer wherein each of said plurality of power outlets is configured to supply power to an electronic device;
a pair of lighting towers, each of said lighting towers being attached to said trailer, each of said lighting towers including a plurality of light emitters, each of said lighting towers being positionable in a variety of directions wherein each of said plurality of light emitters is configured to emit light onto said stage at a desired point, each of said lighting towers extending between said floor of said trailer and said roof of said trailer;
wherein each of said floor panels has a front edge and a back edge, said back edge of each of said floor panels being hingedly coupled to a respective one of a first lateral edge and a second lateral edge of said floor of said trailer, each of said floor panels extending between said front end and said back end of said trailer, each of said floor panels lying on a plane being oriented parallel with said floor of said trailer when said floor panels are in said deployed position, each of said floor panels lying on a plane being perpendicularly oriented with said floor of said trailer when said floor panels are in said stored position having said pair of floor panels extending upwardly from said floor of said trailer; and
a pair of wheel panels, each of said wheel panels having a first edge being hingedly coupled to said front edge of a respective one of said floor panels, each of said wheel panels extending downwardly from said respective floor panel when said respective floor panel is positioned in said deployed position thereby facilitating each of said wheel panels to conceal the undercarriage of said trailer wherein said pair of wheel panels are configured to enhance the appearance of said trailer during the live performance, each of said wheel panels lying against said respective floor panel when said pair of floor panels are in said stored position.

6. A portable stage assembly for facilitating a stage for a live performance to be set up at any location, said assembly comprising:
a trailer being towable by a tow vehicle, said trailer having a floor and a roof, said trailer being open such that said floor defines a stage wherein said stage is configured to facilitate a live performance to be performed on said stage having the live performance being sheltered by said roof;
a pair of floor panels, each of said floor panels being hingedly attached to said trailer, each of said floor panels being positionable in a deployed position having each of said floor panels extending in opposite directions from said trailer such that each of said floor panels increases a size of said stage defined by said floor of said trailer, each of said floor panels being positionable in a stored position having each of said floor panels resting against said trailer;
a pair of roof panels, each of said roof panels being hingedly attached to said trailer, each of said roof panels being positionable in a deployed position having each of said roof panels extending in opposite directions from said trailer such that each of said roof panels increases a size of said roof of said trailer, each of said roof panels being positionable in a stored position having each of said roof panels resting against said trailer;
a pair of stage curtains, each of said stage curtains being slidably attached to said roof of said trailer wherein said pair of stage curtains conceal said stage when said stage curtains are closed and expose said stage when said pair of stage curtains are opened;
a plurality of power outlets, each of said plurality of power outlets being integrated into said floor of said trailer wherein each of said plurality of power outlets is configured to supply power to an electronic device;

a pair of lighting towers, each of said lighting towers being attached to said trailer, each of said lighting towers including a plurality of light emitters, each of said lighting towers being positionable in a variety of directions wherein each of said plurality of light emitters is configured to emit light onto said stage at a desired point, each of said lighting towers extending between said floor of said trailer and said roof of said trailer; and a tailgate floor panel having a first edge being hingedly coupled to a rear edge of said floor of said trailer, said tailgate floor panel lying on a plane being oriented parallel with said floor of said trailer when said tailgate floor panel is in said deployed position, said tailgate floor panel lying on a plane being perpendicularly oriented with said floor of said trailer when said floor panels are in said stored position having said tailgate floor panel extending upwardly from said floor of said trailer, said tailgate floor panel extending between said first lateral edge and said second lateral edge of said floor of said trailer.

7. The assembly according to claim 6, further comprising a tailgate wheel panel having a first edge being hingedly coupled to a second edge of said tailgate floor panel, said tailgate wheel panel extending downwardly from said tailgate floor panel when said tailgate floor panel is positioned in said deployed position thereby facilitating said tailgate wheel panel to conceal the undercarriage of said trailer wherein said tailgate wheel panel is configured to enhance the appearance of said trailer during the live performance, said tailgate wheel panel lying against said tailgate floor panel when said tailgate floor panels is in said stored position.

8. The assembly according to claim 6, further comprising a plurality of floor actuators, each of said floor actuators being coupled between said floor of said trailer and a respective one of said floor panels and said tailgate floor panel, said plurality of floor actuators being biased into an extended condition to urge said respective floor panels and said tailgate floor panel into said deployed position, each of said floor actuators being urgeable into a collapsed condition to facilitate said plurality of floor panels and said tailgate floor panel to be positioned in said stored position.

9. A portable stage assembly for facilitating a stage for a live performance to be set up at any location, said assembly comprising:
a trailer being towable by a tow vehicle, said trailer having a floor and a roof, said trailer being open such that said floor defines a stage wherein said stage is configured to facilitate a live performance to be performed on said stage having the live performance being sheltered by said roof;
a pair of floor panels, each of said floor panels being hingedly attached to said trailer, each of said floor panels being positionable in a deployed position having each of said floor panels extending in opposite directions from said trailer such that each of said floor panels increases a size of said stage defined by said floor of said trailer, each of said floor panels being positionable in a stored position having each of said floor panels resting against said trailer;
a pair of roof panels, each of said roof panels being hingedly attached to said trailer, each of said roof panels being positionable in a deployed position having each of said roof panels extending in opposite directions from said trailer such that each of said roof panels increases a size of said roof of said trailer, each of said roof panels being positionable in a stored position having each of said roof panels resting against said trailer;
a pair of stage curtains, each of said stage curtains being slidably attached to said roof of said trailer wherein said pair of stage curtains conceal said stage when said stage curtains are closed and expose said stage when said pair of stage curtains are opened;
a plurality of power outlets, each of said plurality of power outlets being integrated into said floor of said trailer wherein each of said plurality of power outlets is configured to supply power to an electronic device;
a pair of lighting towers, each of said lighting towers being attached to said trailer, each of said lighting towers including a plurality of light emitters, each of said lighting towers being positionable in a variety of directions wherein each of said plurality of light emitters is configured to emit light onto said stage at a desired point, each of said lighting towers extending between said floor of said trailer and said roof of said trailer; and
a tailgate roof panel having a first edge being hingedly coupled to a rear edge of said roof of said trailer, said tailgate roof panel lying on a plane being oriented parallel with said roof of said trailer when said tailgate roof panel is in a deployed position, said tailgate roof panel lying on a plane being perpendicularly oriented with said roof of said trailer when said tailgate roof panel is in a stored position having said tailgate roof panel extending upwardly from said floor of said trailer, said tailgate roof panel extending between said first lateral edge and said second lateral edge of said roof of said trailer.

10. The assembly according to claim 9, further comprising a plurality of roof actuators, each of said roof actuators being coupled between said roof of said trailer and a respective one of said roof panels and said tailgate roof panel, said plurality of roof actuators being biased into an extended condition to urge said roof panels and said tailgate roof panel into said deployed position, each of said roof actuators being urgeable into a collapsed condition to facilitate said plurality of roof panels to be urged into said stored position.

11. A portable stage assembly for facilitating a stage for a live performance to be set up at any location, said assembly comprising:
a trailer being towable by a tow vehicle, said trailer having a floor and a roof, said trailer being open such that said floor defines a stage wherein said stage is configured to facilitate a live performance to be performed on said stage having the live performance being sheltered by said roof, said trailer having a plurality of corner posts each extending between said floor and said roof for supporting said roof over said floor, each of said plurality of corner posts being aligned with a respective one of four corners of said floor, said trailer having a front end, a back end, a first lateral side and a second lateral side, said front end being closed, each of said first lateral side and said second lateral side and said back end being open, said floor having a top surface comprising a friction enhancing material wherein said floor is configured to facilitate performers to maintain solid footing on said floor;
a pair of floor panels, each of said floor panels being hingedly attached to said trailer, each of said floor panels being positionable in a deployed position having each of said floor panels extending in opposite directions from said trailer such that each of said floor panels increases the size of said stage defined by said floor of said trailer, each of said floor panels being positionable in a stored position having each of said floor panels resting against said trailer, each of said floor panels having a front edge and a back edge, said back edge of each of said floor panels being hingedly coupled to a respective one of a first lateral edge and a second lateral edge of said floor of said trailer, each of said floor panels extending between said front end and said back end of said trailer, each of said floor panels lying on a plane being oriented parallel with said floor of said trailer when said floor panels are in said deployed position, each of said floor panels lying on a plane being perpendicularly oriented with said floor of said trailer when said floor panels are in said stored position having said pair of floor panels extending upwardly from said floor of said trailer;

a pair of wheel panels, each of said wheel panels having a first edge being hingedly coupled to said front edge of a respective one of said floor panels, each of said wheel panels extending downwardly from said respective floor panel when said respective floor panel is positioned in said deployed position thereby facilitating each of said wheel panels to conceal the undercarriage of said trailer wherein said pair of wheel panels are configured to enhance the appearance of said trailer during the live performance, each of said wheel panels lying against said respective floor panel when said pair of floor panels are in said stored position;

a pair of roof panels, each of said roof panels being hingedly attached to said trailer, each of said roof panels being positionable in a deployed position having each of said roof panels extending in opposite directions from said trailer such that each of said roof panels increases the size of said roof of said trailer, each of said roof panels being positionable in a stored position having each of said roof panels resting against said trailer, each of said roof panels having a forward edge and a rearward edge, said forward edge of each of said roof panels being hingedly coupled to a respective one of a first lateral edge and a second lateral edge of said roof of said trailer, each of said roof panels extending between said front end and said back end of said trailer, each of said roof panels lying on a plane being oriented parallel with said roof of said trailer when said roof panels are in said deployed position, each of said roof panels lying on a plane being oriented perpendicular to said roof of said trailer when said roof panels are in said stored position having said pair of roof panels extending downwardly from said roof of said trailer;

a tailgate floor panel having a first edge being hingedly coupled to a rear edge of said floor of said trailer, said tailgate floor panel lying on a plane being oriented parallel with said floor of said trailer when said tailgate floor panel is in said deployed position, said tailgate floor panel lying on a plane being perpendicularly oriented with said floor of said trailer when said floor panels are in said stored position having said tailgate floor panel extending upwardly from said floor of said trailer, said tailgate floor panel extending between said first lateral edge and said second lateral edge of said floor of said trailer;

a tailgate wheel panel having a first edge being hingedly coupled to a second edge of said tailgate floor panel, said tailgate wheel panel extending downwardly from said tailgate floor panel when said tailgate floor panel is positioned in said deployed position thereby facilitating said tailgate wheel panel to conceal the undercarriage of said trailer wherein said tailgate wheel panel is configured to enhance the appearance of said trailer during the live performance, said tailgate wheel panel lying against said tailgate floor panel when said tailgate floor panels is in said stored position;

a tailgate roof panel having a first edge being hingedly coupled to a rear edge of said roof of said trailer, said tailgate roof panel lying on a plane being oriented parallel with said roof of said trailer when said tailgate roof panel is in a deployed position, said tailgate roof panel lying on a plane being perpendicularly oriented with said roof of said trailer when said tailgate roof panel is in a stored position having said tailgate roof panel extending upwardly from said floor of said trailer, said tailgate roof panel extending between said first lateral edge and said second lateral edge of said roof of said trailer;

a plurality of roof actuators, each of said roof actuators being coupled between said roof of said trailer and a respective one of said roof panels and said tailgate roof panel, said plurality of roof actuators being biased into an extended condition to urge said roof panels and said tailgate roof panel into said deployed position, each of said roof actuators being urgeable into a collapsed condition to facilitate said plurality of roof panels to be urged into said stored position;

a plurality of floor actuators, each of said floor actuators being coupled between said floor of said trailer and a respective one of said floor panels and said tailgate floor panel, said plurality of floor actuators being biased into an extended condition to urge said respective floor panels and said tailgate floor panel into said deployed position, each of said floor actuators being urgeable into a collapsed condition to facilitate said plurality of floor panels and said tailgate floor panel to be positioned in said stored position;

a pair of stage curtains, each of said stage curtains being slidably attached to said roof of said trailer thereby facilitating said pair of stage curtains to conceal said stage when said stage curtains are closed or to expose said stage when said pair of stage curtains are opened, each of said stage curtains having a top edge, wherein said top edge slidably engages a bottom surface of said roof of said trailer;

a plurality of power outlets, each of said plurality of power outlets being integrated into said floor of said trailer wherein each of said plurality of power outlets is configured to supply power to an electronic device;

a pair of lighting towers, each of said lighting towers being attached to said trailer, each of said lighting towers including a plurality of light emitters each of said lighting towers being positionable in a variety of directions wherein each of said plurality of light emitters is configured to emit light onto said stage at a desired point, each of said lighting towers extending between said floor of said trailer and said roof of said trailer, each of said lighting towers being aligned with said first lateral edge of said floor of said trailer, each of said lighting towers being aligned with a respective one of said front end and said back end of said trailer; and a generator being attached to said front end of said trailer, said generator being in electrical communication with each of said plurality of power outlets and each of said plurality of light emitters such that said generator supplies electrical power to each of said plurality of power outlets and each of said plurality of light emitters when said generator is turned on.

\* \* \* \* \*